US012699937B2

(12) United States Patent
Ishido et al.

(10) Patent No.: US 12,699,937 B2
(45) Date of Patent: Aug. 4, 2026

(54) PRODUCTION SCHEDULE CHANGE ASSISTANCE APPARATUS, PRODUCTION SCHEDULE CHANGE ASSISTANCE METHOD, PROGRAM THEREFOR, AND PRODUCTION MANAGEMENT SYSTEM

(71) Applicant: Hitachi, Ltd., Tokyo (JP)

(72) Inventors: Yumiko Ishido, Tokyo (JP); Yuichi Kobayashi, Tokyo (JP); Yuko Yamashita, Tokyo (JP)

(73) Assignee: Hitachi, LTD., Tokyo (JP)

( * ) Notice: Subject to any disclaimer, the term of this patent is extended or adjusted under 35 U.S.C. 154(b) by 1124 days.

(21) Appl. No.: 17/679,673

(22) Filed: Feb. 24, 2022

(65) Prior Publication Data

US 2022/0414582 A1     Dec. 29, 2022

(30) Foreign Application Priority Data

Jun. 28, 2021     (JP) ................................. 2021-106456

(51) Int. Cl.
| | |
|---|---|
| *G06Q 10/0631* | (2023.01) |
| *G06N 5/022* | (2023.01) |
| *G06N 5/04* | (2023.01) |

(52) U.S. Cl.
CPC ..... *G06Q 10/063116* (2013.01); *G06N 5/022* (2013.01); *G06N 5/04* (2013.01)

(58) Field of Classification Search
CPC ....... G06Q 10/063116; G06Q 10/0631; G06Q 10/06312; G06Q 10/06315;
(Continued)

(56) References Cited

U.S. PATENT DOCUMENTS

2019/0228360 A1     7/2019  Aoyama et al.
2020/0058081 A1*    2/2020  Saneyoshi ............ G05B 19/406
(Continued)

FOREIGN PATENT DOCUMENTS

| JP | 2004-029874 A | 1/2004 |
|---|---|---|
| JP | 2007157124 A | 6/2007 |
| JP | 2019-188868 A | 10/2019 |

OTHER PUBLICATIONS

Extended European Search Report issued on May 27, 2022 for European Patent Application No. 22157427.0.
(Continued)

*Primary Examiner* — Cesar B Paula
*Assistant Examiner* — David Tan
(74) *Attorney, Agent, or Firm* — Volpe Koenig

(57) ABSTRACT

A schedule change apparatus includes a change model creation section, a schedule creation section, a schedule change evaluation indicator creation section, a production simulator, and a control section. The change model creation section creates a change model estimating a portion of the schedule to be changed. The schedule creation section uses the schedule change model to generate proposed schedule changes and generate a proposed alternative schedule. The schedule change evaluation section generates a schedule change evaluation indicator indicating a best value for a proposed schedule change. The production simulator implements simulation with a simulation condition changed on a basis of schedule execution status information and equipment operation status information for the day and calculates values of the schedule change evaluation indicator for the proposed alternative schedule candidate group on a basis of the schedule change evaluation indicator already learned. The control section outputs a proposed schedule change.

12 Claims, 10 Drawing Sheets

(58) Field of Classification Search
CPC ......... G06Q 10/0637; G06Q 10/06393; G06Q
50/04; G06N 5/022; G06N 5/04; Y02P
90/30
See application file for complete search history.

(56)                References Cited

U.S. PATENT DOCUMENTS

| | | | |
|---|---|---|---|
| 2020/0272136 A1 | 8/2020 | Fujita et al. | |
| 2022/0253954 A1* | 8/2022 | Brown | G06Q 10/06312 |
| 2022/0343155 A1* | 10/2022 | Mitra | G06F 18/217 |

OTHER PUBLICATIONS

Japanese Office Action issued on Jan. 21, 2025 for Japanese Patent
Application No. 2021-106456.
Chinese Office Action issued on Mar. 7, 2026 for Chinese Patent
Application No. 202210117621.2.

* cited by examiner

F I G . 2
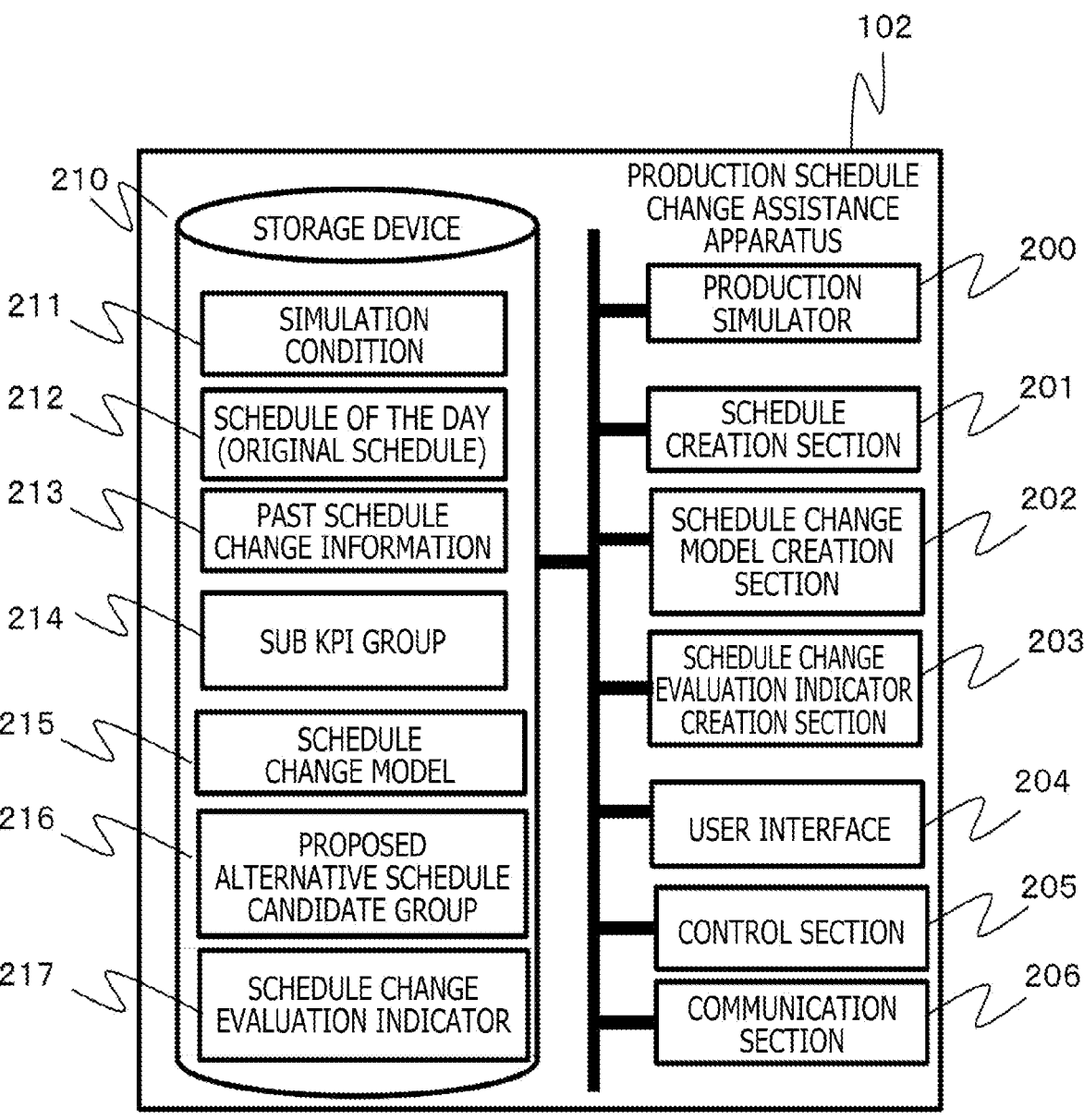

| ORDER ID | TYPE ID | LENGTH | WIDTH | HEIGHT | QUANTITY | MASS | DELIVERY DATE |
|----------|---------|--------|-------|--------|----------|------|---------------|
| Ord-1 | Rcp-4 | 1m | 1m | 10cm | 3 | 2.4kg | 2014/8/25 17:00 |
| Ord-2 | Rcp-4 | 1m | 1.2m | 50cm | 2 | 1.0kg | 2014/8/26 17:00 |
| Ord-3 | Rcp-3 | 1m | 0.8m | 10cm | 2 | 1.3kg | 2014/8/25 17:00 |
| ... | ... | ... | ... | ... | ... | ... | ... |

F I G . 5

| SCHEDULE ID | ORDER ID | TYPE ID | STEP 1 LINE A ID | STEP 1 LINE B ID | STEP 2 ID | STEP 3 ID | STEP 4 ID | LENGTH | WIDTH | HEIGHT | QUANTITY | MASS | SCHEDULED COMPLETION DATE AND TIME |
|---|---|---|---|---|---|---|---|---|---|---|---|---|---|
| Pln-1 | Ord-2 | Rcp-4 | ChgA5-1 | - | Cst3-1 | Slb6-0 | Rol-4 | 1m | 1.2m | 50cm | 2 | 1.0kg | 2014/8/24 04:24 |
| Pln-2 | Ord-1 | Rcp-4 | ChgA5-2 | - | Cst3-2 | Slb7-0 | Rol-5 | 1m | 1m | 10cm | 3 | 2.4kg | 2014/8/24 08:24 |
| Pln-3 | Ord-3 | Rcp-3 | - | ChgB6-1 | Cst3-3 | Slb8-0 | Rol-6 | 1m | 0.8m | 10cm | 2 | 1.3kg | 2014/8/24 14:15 |
| ... | ... | ... | ... | ... | ... | ... | ... | ... | ... | ... | ... | ... | ... |

501　502　503　504a　504b　505　506　507　508　509　510　511　512　513　514　515　516

F I G . 7
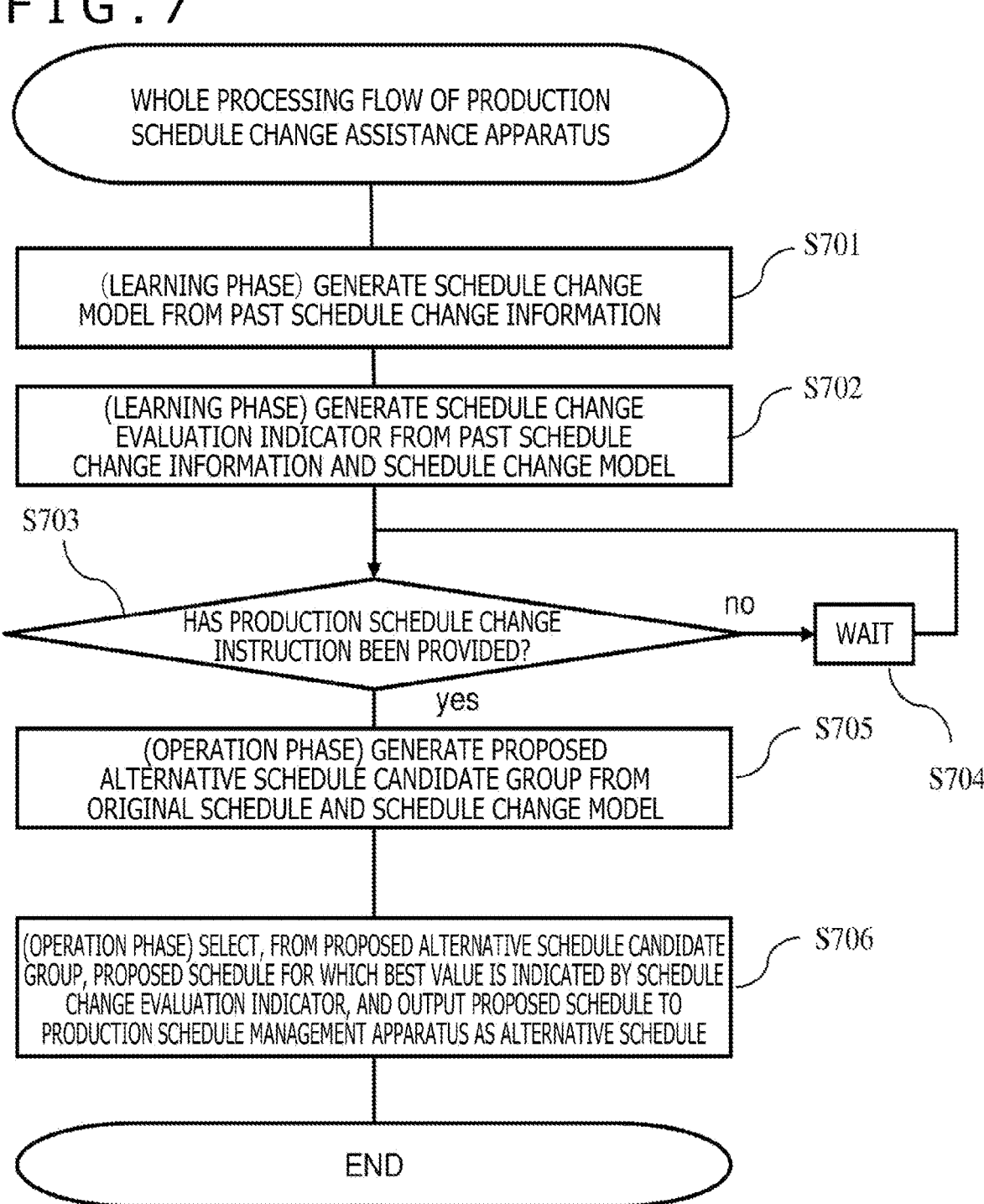

FIG.8

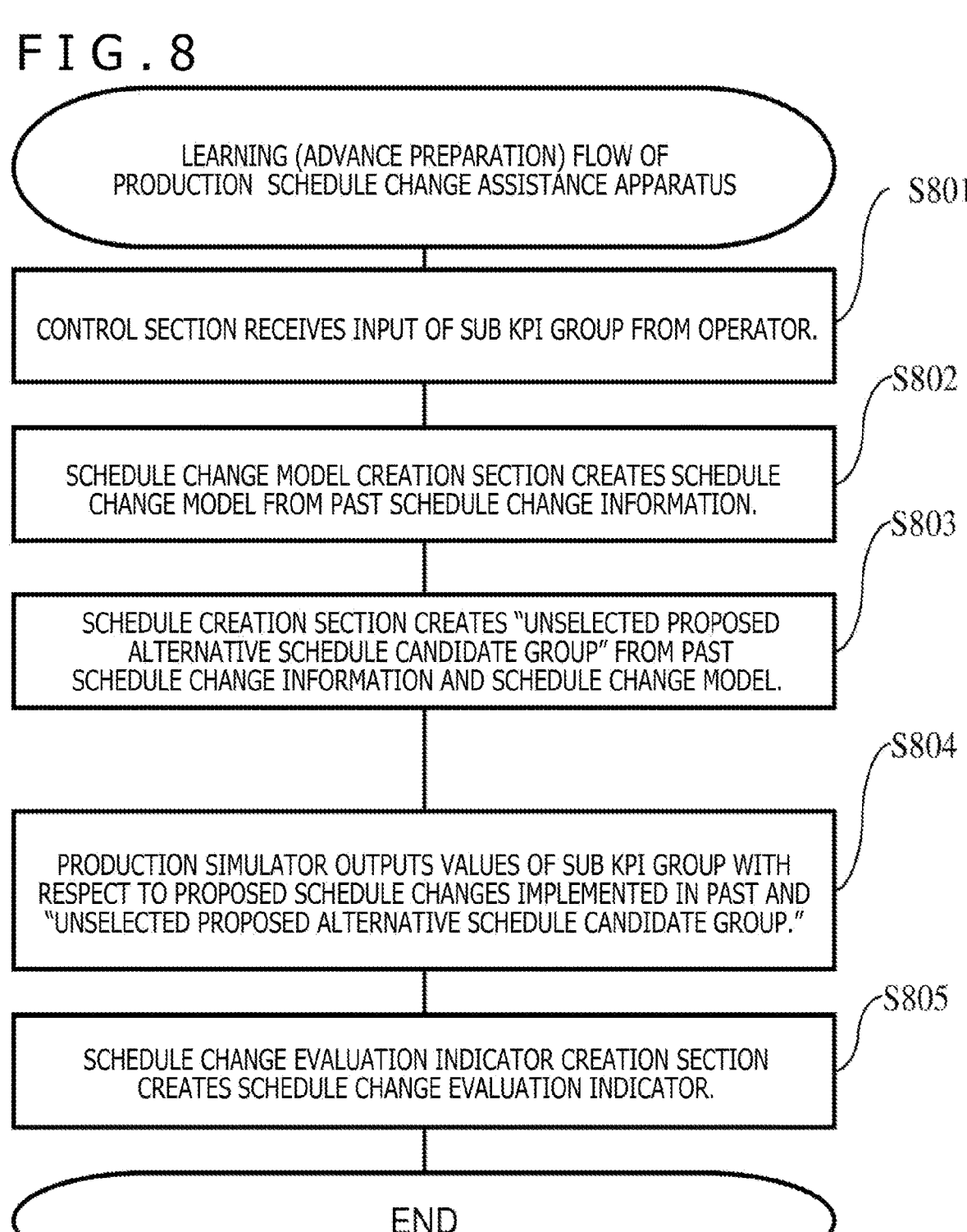

LEARNING (ADVANCE PREPARATION) FLOW OF
PRODUCTION SCHEDULE CHANGE ASSISTANCE APPARATUS          S801

CONTROL SECTION RECEIVES INPUT OF SUB KPI GROUP FROM OPERATOR.          S802

SCHEDULE CHANGE MODEL CREATION SECTION CREATES SCHEDULE
CHANGE MODEL FROM PAST SCHEDULE CHANGE INFORMATION.          S803

SCHEDULE CREATION SECTION CREATES "UNSELECTED PROPOSED
ALTERNATIVE SCHEDULE CANDIDATE GROUP" FROM PAST
SCHEDULE CHANGE INFORMATION AND SCHEDULE CHANGE MODEL.          S804

PRODUCTION SIMULATOR OUTPUTS VALUES OF SUB KPI GROUP WITH
RESPECT TO PROPOSED SCHEDULE CHANGES IMPLEMENTED IN PAST AND
"UNSELECTED PROPOSED ALTERNATIVE SCHEDULE CANDIDATE GROUP."          S805

SCHEDULE CHANGE EVALUATION INDICATOR CREATION SECTION
CREATES SCHEDULE CHANGE EVALUATION INDICATOR.

END

FIG.9

| MODIFICATION KPI INPUT SCREEN |
|---|

NUMBER OF SUB KPIS   | 4 |

FIRST SUB KPI                  | TOTAL DELIVERY DELAY TIME |

SECOND SUB KPI            | TOTAL PRODUCTION LEAD TIME |

THIRD SUB KPI                 | NUMBER OF CHANGES IN SCHEDULE |

FOURTH SUB KPI    | WORKING HOURS | BETWEEN | 18:00 | AND | 24:00 |

| ADD SUB KPI | ▼CONDITION (DATE AND TIME/GROUP) | ▼EVALUATION ITEM |

FIG.10

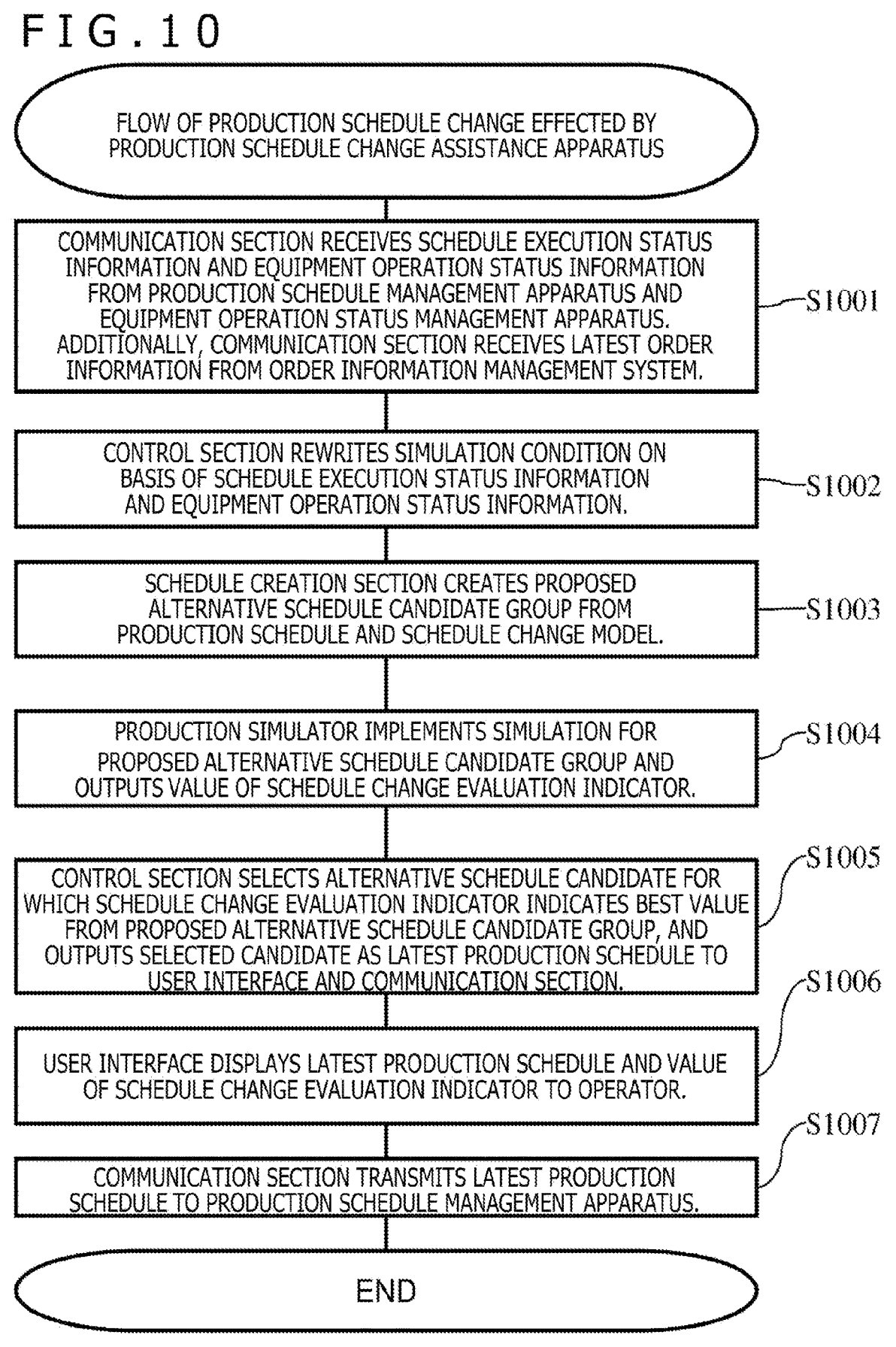

```
┌──────────────────────────────────────────────────────┐
│   FLOW OF PRODUCTION SCHEDULE CHANGE EFFECTED BY       │
│   PRODUCTION SCHEDULE CHANGE ASSISTANCE APPARATUS      │
└──────────────────────────────────────────────────────┘
```

COMMUNICATION SECTION RECEIVES SCHEDULE EXECUTION STATUS INFORMATION AND EQUIPMENT OPERATION STATUS INFORMATION FROM PRODUCTION SCHEDULE MANAGEMENT APPARATUS AND EQUIPMENT OPERATION STATUS MANAGEMENT APPARATUS. ADDITIONALLY, COMMUNICATION SECTION RECEIVES LATEST ORDER INFORMATION FROM ORDER INFORMATION MANAGEMENT SYSTEM. ⸺S1001

CONTROL SECTION REWRITES SIMULATION CONDITION ON BASIS OF SCHEDULE EXECUTION STATUS INFORMATION AND EQUIPMENT OPERATION STATUS INFORMATION. ⸺S1002

SCHEDULE CREATION SECTION CREATES PROPOSED ALTERNATIVE SCHEDULE CANDIDATE GROUP FROM PRODUCTION SCHEDULE AND SCHEDULE CHANGE MODEL. ⸺S1003

PRODUCTION SIMULATOR IMPLEMENTS SIMULATION FOR PROPOSED ALTERNATIVE SCHEDULE CANDIDATE GROUP AND OUTPUTS VALUE OF SCHEDULE CHANGE EVALUATION INDICATOR. ⸺S1004

CONTROL SECTION SELECTS ALTERNATIVE SCHEDULE CANDIDATE FOR WHICH SCHEDULE CHANGE EVALUATION INDICATOR INDICATES BEST VALUE FROM PROPOSED ALTERNATIVE SCHEDULE CANDIDATE GROUP, AND OUTPUTS SELECTED CANDIDATE AS LATEST PRODUCTION SCHEDULE TO USER INTERFACE AND COMMUNICATION SECTION. ⸺S1005

USER INTERFACE DISPLAYS LATEST PRODUCTION SCHEDULE AND VALUE OF SCHEDULE CHANGE EVALUATION INDICATOR TO OPERATOR. ⸺S1006

COMMUNICATION SECTION TRANSMITS LATEST PRODUCTION SCHEDULE TO PRODUCTION SCHEDULE MANAGEMENT APPARATUS. ⸺S1007

```
┌──────────────────────────────────────────────────────┐
│                        END                             │
└──────────────────────────────────────────────────────┘
```

F I G . 1 1

| SCHEDULE ID | ORDER ID | TYPE ID | STEP 1 LINE A ID | STEP 1 LINE B ID | STEP 2 ID | STEP 3 ID | STEP 4 ID | LENGTH | WIDTH | HEIGHT | QUANTITY | MASS | SCHEDULED COMPLETION DATE AND TIME |
|---|---|---|---|---|---|---|---|---|---|---|---|---|---|
| Pln-1 | Ord-2 | Rep-4 | ChgA5-2 | | Cst3-2 | Slb7-0 | Rol-5 | 1m | 1.2m | 50cm | 2 | 1.0kg | 2014/8/24 08:24 |
| Pln-2 | Ord-1 | Rep-4 | ChgA5-3 | | Cst3-3 | Slb8-0 | Rol-6 | 1m | 1m | 10cm | 3 | 2.4kg | 2014/8/24 12:24 |
| Pln-3 | Ord-3 | Rep-3 | - | ChgB6-1 | Cst3-4 | Slb8-0 | Rol-7 | 1m | 0.8m | 10cm | 2 | 1.3kg | 2014/8/24 16:15 |
| Pln-17 | Ord-702 | Rep-10 | ChgA5-1 | - | Cst3-1 | Slb5-0 | Rol-4 | 1m | 1.5m | 20cm | 2 | 2.0kg | 2014/8/24 04:24 |

1

PRODUCTION SCHEDULE CHANGE ASSISTANCE APPARATUS, PRODUCTION SCHEDULE CHANGE ASSISTANCE METHOD, PROGRAM THEREFOR, AND PRODUCTION MANAGEMENT SYSTEM

BACKGROUND OF THE INVENTION

1. Field of the Invention

The present invention relates to a production schedule change assistance technology for assisting modification of a production schedule due to an interrupt order or the like.

2. Description of the Related Art

For cases with a wide variety of resources and constraint conditions for performing a task such as production of industrial products, construction of a large-scale structure, or dispatch of many trucking vehicles, properness of scheduling is likely to significantly affect production efficiency, quality, delivery date, and the like of deliverables. Furthermore, on the day when the schedule is implemented, the schedule prepared in advance is likely to be prevented from being executed as intended due to a problem with facility or allocated personnel, a sudden interrupt order, or a change in situation such as a road congestion or a sudden change in the weather. In such a case, the need arises to quickly make an alternative executable schedule in order to mitigate adverse effects on the production efficiency, quality, and delivery date.

In such a case, problems as described below may occur when an attempt is made to prepare an alternative schedule using a conventional technology that is used in advance scheduling. In the advance scheduling, in some cases, solutions can be searched for using a sufficient time of one day or more, whereas in many cases, an alternative schedule for the day needs to be prepared in several minutes or so, and intended changes need to be informed to sections concerned in several to several tens of minutes and to be agreed on. Additionally, in preparation of an alternative schedule, for example, in consideration of control of a production schedule system for maintenance, human resource scheduling, and the like, and integrity with external cooperative scheduling, an operator often attempts to reduce intended changes that affect the control or the integrity. However, in such a case, it is difficult to define appropriate objective functions for preparing an alternative schedule using only information held by a production schedule change assistance system. In addition, in operational interviews, the operator can indicate matters about which the operator is concerned in changing the schedule, but has difficulty in clarifying what schedule changes are to be effected in what state of combinations of the matters. Due to the temporal constraints and the difficulty in explicit setting of objective functions as described above, it is difficult to prepare an alternative schedule with an expected accuracy within an expected time for the day using the existing technology at the time of the advance scheduling.

In such a situation, as a technology for preparing an alternative schedule for the day, JP-2019-188868-A (Patent Literature 1) has been proposed. Patent Literature 1 states that "An object is to provide a traffic management system that can integrally manage traffic of trains. The traffic management system according to the present embodiment is a traffic management system assisting traffic management for vehicles performed by a dispatcher, the traffic management system including a dispatching assistance processing section configured to execute processing required to assist dispatching corresponding to a task for traffic management for the vehicles, and a dispatcher assistance section configured to assist a task of the dispatcher performing operation management for the vehicles on the basis of processing results from the dispatching assistance processing section. The dispatching assistance processing section includes a predicted timetable creation section configured to create a predicted timetable that predicts traffic of the trains for the day, and the dispatcher assistance section includes a predicted timetable presentation section configured to present the dispatcher with the predicted timetable created by the predicted timetable creation section" (see ABSTRACT).

SUMMARY OF THE INVENTION

Patent Literature 1 discloses a method for the field of railroads, the method including assisting preparation of an alternative schedule for the day by learning proposed traffic schedule changes from past timetables, creating a model predicting whether or not a traffic schedule needs to be changed in accordance with various situations, and in light of the model, predicting whether or not the traffic schedule needs to be changed and presenting the prediction to the operator. However, the method in Patent Literature 1 has a problem in that, in a case where a timetable revision, a change in traffic schedule for the day, or the like has led to a difference between a traffic schedule for the trains used at the time of creation of the model and a traffic schedule for the trains at the time of prediction of whether or not the traffic schedule needs to be changed, the model created has a reduced degree of compatibility. Thus, it has been difficult to apply the present technology to a production schedule system in which a fluctuation of constraint conditions used as requirements for scheduling occurs frequently due to a change in environmental conditions for the day such as the availability of extra human resources and facilities for the day, a maintenance status, and a production progress status.

An object of the present invention is to provide a production schedule change assistance apparatus, a production schedule change assistance method, a program therefor, and a production management system in which, even in a case where there is a difference between constraint conditions used at the time of creation of a determination model related to a change in a production schedule and constraint conditions at the time of creation of an alternative schedule, a proposed alternative schedule similar to the schedule intended by a scheduler at the creation of the determination model can be quickly created.

To achieve this object, for example, a configuration recited in the claims is adopted. The present application includes a plurality of means for solving the problems described above, and an example of the means is a production schedule change assistance apparatus for changing a production schedule in response to a change in order information. The production schedule change assistance apparatus includes a schedule change model creation section, a schedule creation section, a schedule change evaluation indicator creation section, a production simulator, and a control section. The schedule change model creation section creates, in a learning phase, from past schedule change information, a schedule change model estimating a portion of the schedule to be changed in response to an order change and a content of the change. The schedule creation section uses, in the learning phase, the schedule change model to generate a group of proposed schedule changes unselected at a time of past implementation of schedule changes and uses, in an operation phase, the schedule change model already learned, to generate a proposed alternative schedule candidate group for the order change. The schedule change evaluation indicator creation section generates, in the learning phase, a schedule change evaluation indicator indicating a best value for a proposed schedule change implemented at a time of past schedule change compared to proposed schedule changes unselected at the time of past schedule change. The production simulator implements, in the operation phase, simulation with a simulation condition changed on a basis of schedule execution status information and equipment operation status information for the day and calculates values of the schedule change evaluation indicator for the proposed alternative schedule candidate group on a basis of the schedule change evaluation indicator already learned. The control section outputs, as a latest production schedule, a proposed schedule change included in the proposed alternative schedule candidate group and for which the schedule change evaluation indicator indicates the best value.

According to the present invention, even in a case where there is a difference between constraint conditions used at the time of creation of a determination model related to a change in a production schedule and constraint conditions at the time of creation of an alternative schedule, a proposed alternative schedule similar to the schedule intended by a scheduler at the creation of the determination model can be quickly created.

Objects, configurations, and effects other than those described above will be clarified by the description of an embodiment below.

BRIEF DESCRIPTION OF THE DRAWINGS

FIG. 2 is a configuration diagram of a production schedule change assistance apparatus in the embodiment;

FIG. 5 illustrates an example of a production schedule output by the production schedule change assistance apparatus;

FIG. 7 is a flowchart of whole processing executed by the production schedule change assistance apparatus;

FIG. 8 is a flowchart of learning (advance preparation) performed by the production schedule change assistance apparatus;

FIG. 9 illustrates an example of an input screen for modified key performance indicators (KPIs);

FIG. 10 is a flowchart of production schedule change (operation phase) made by the production schedule change assistance apparatus; and FIG. 11 illustrates an example of a production schedule change output by the production schedule change assistance apparatus.

DESCRIPTION OF THE PREFERRED EMBODIMENT

An embodiment of the present invention will be described below in detail using the drawings. However, the present invention is not limited to the contents of the embodiment described below for interpretation. A person skilled in the art easily understands that specific configurations of the embodiment of the present invention may be changed without departing from the concepts and spirits of the present invention.

Embodiment

In the present embodiment, a production schedule representing the order of production of a product and production steps are managed.

To facilitate understanding of description of the embodiment of a production schedule change assistance apparatus below, the production steps are referred to as a first step, a second step, . . . , and an n-th step.

System Configuration

A system configuration of the present embodiment will be described using FIGS. 1 and 2.

Figure 1:
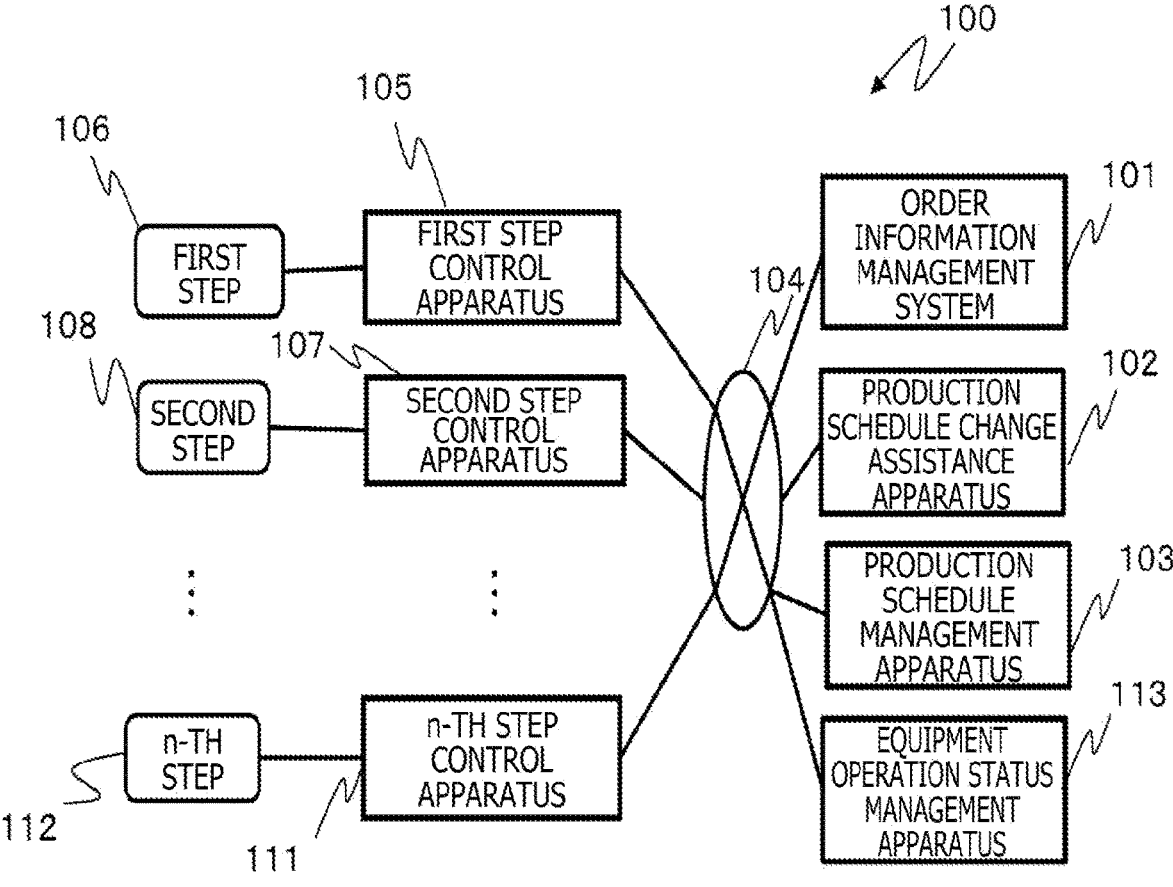
FIG. 1 is a configuration diagram of a production management system in an embodiment.

FIG. 1 is a system configuration diagram illustrating a configuration of a production management system in the embodiment. A production management system 100 includes an order information management system 101, a production schedule change assistance apparatus 102, a production schedule management apparatus 103, a network 104, a first step control apparatus 105, a first step 106, a second step control apparatus 107, a second step 108, . . . , an n-th step control apparatus 111, an n-th step 112, and an equipment operation status management apparatus 113.

The production management system 100 uses information from the order information management system 101 as an input, uses the production schedule change assistance apparatus 102 to update a production schedule, and causes the production schedule management apparatus 103 to store a latest production schedule. The production schedule management apparatus 103 respectively transmits a first step control output, a second step control output, and an n-th step control output in the latest production schedule to the first step control apparatus 105, the second step control apparatus 107, . . . , and the n-th step control apparatus 111. The first step control apparatus 105, the second step control apparatus 107, and the n-th step control apparatus 111 respectively control the first step 106, the second step 108, . . . , and the n-th step 112. In some time periods, part or all of the equipment in each step is prevented from operating due to maintenance work or a problem, and information regarding such operation status of the step equipment is managed by the equipment operation status management apparatus 113. Information is transmitted and received among components via the network 104.

FIG. 2 illustrates a system configuration of the production schedule change assistance apparatus 102. The production schedule change assistance apparatus 102 includes a production simulator 200, a schedule creation section 201, a schedule change model creation section 202, a schedule change evaluation indicator creation section 203, a user interface 204, a control section 205, a communication section 206, and a storage device 210. The storage device 210 stores a simulation condition 211, a schedule for the day (original schedule) 212, past schedule change information 213, a sub KPI (evaluation indicator) group 214, a schedule change model 215, a proposed alternative schedule candidate group 216, and a schedule change evaluation indicator 217.

The production schedule change assistance apparatus 102 receives the latest production schedule from the production schedule management apparatus 103 and saves the latest production schedule as the schedule for the day (original schedule) 212. Furthermore, the production schedule change assistance apparatus 102 receives equipment operation statuses from the equipment operation status management apparatus 113, and rewrites the simulation condition 211 used for the production simulator 200 such that the simulation condition 211 matches the current operation status.

At this time, the communication section 206 controls transmission and reception of signals among the components of the production management system 100, and the control section 205 controls the system such that the devices in the production schedule change assistance apparatus 102 are integrated and collectively create the latest production schedule from the input to transmit the production schedule to the production schedule management apparatus 103.

The production simulator 200 is a device configured to calculate values for the sub KPI group 214 obtained in a case where the alternative schedule candidates of the proposed alternative schedule candidate group are executed under the simulation condition 211.

The schedule creation section 201 is a device configured to create the proposed alternative schedule candidate group 216 from the schedule for the day (original schedule) 212 and the schedule change model 215.

The schedule change model creation section 202 is a device configured to create the schedule change model 215 from the past schedule change information 213.

The schedule change evaluation indicator creation section 203 is a device configured to create the schedule change evaluation indicator 217 including a combination of sub KPIs of the sub KPI group 214.

The user interface is a device configured to receive an input of the sub KPI group 214 from an administrator of the production schedule change assistance apparatus 102, and display the results of a prepared production schedule.

Figure 3:
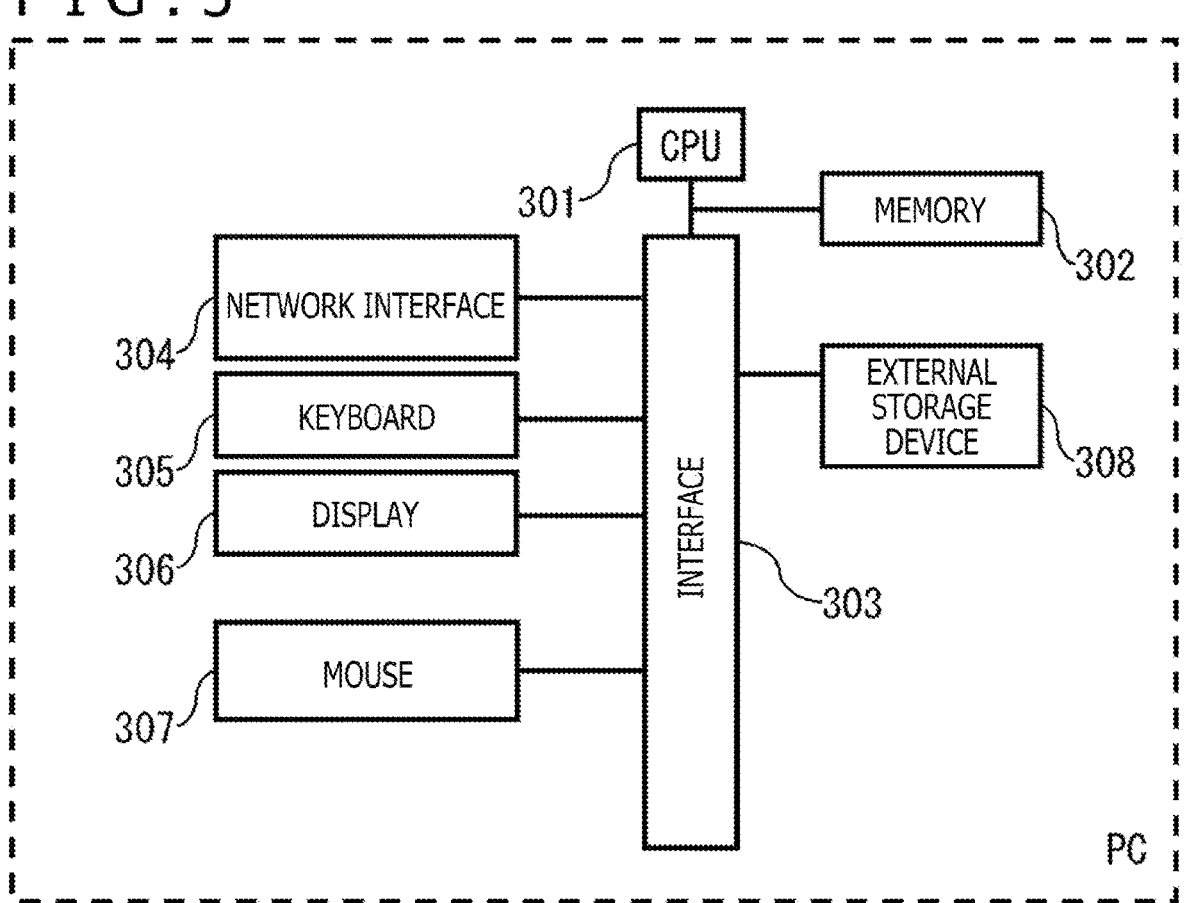
FIG. 3 is a diagram illustrating an internal configuration of a computer.

FIG. 3 is a configuration example of a computer implementing the production schedule change assistance apparatus 102. The production schedule change assistance apparatus 102 is implemented by causing a computer such as a general personal computer (PC) to execute a program.

The computer includes a CPU 301, a memory 302, an interface 303, a network interface 304, a keyboard 305, a display 306, a mouse 307, and an external storage device 308 such as a hard disk.

The CPU 301 is a central processing unit and is a device that can execute programs recorded in the memory 302 or transferred in advance to the memory 302 from the external storage device 308. Note that the programs can be utilized by the PC as needed and may be introduced via a removable storage medium. In this case, a device configured to perform read from the storage medium is connected to the interface 303. Note that, as the storage medium and the device configured to perform read the storage medium as described above, media and devices are known that include an optical disc (compact disc (CD), digital versatile disc (DVD), Blue-ray disc, or the like) or a flash memory, and such a medium and a device can be used. Additionally, the programs can be introduced into the PC as needed by the network interface 304 via a communication medium (communication line or a carrier wave on the communication line).

Programs and data are temporarily recorded in the memory 302. The interface 303 is configured to connect the devices in the PC system. The network interface 304 is a device configured to communicate with PCs or the like outside the PC system. The keyboard 305 is a device operated by an operator of the PC system to input instructions and data to the PC system. The display 306 is a device configured to display processing results and the like. The mouse 307 is a device that moves a pointer displayed on a screen and that prompts the operator to depress a button at any location to specify a position on the screen, communicating a certain action to the CPU 301. Note that the mouse 307 may be replaced with a touch panel and that, in that case, the pointer is normally unnecessary.

The external storage device 308 is a device configured to store programs and data, and may include, for example, a magnetic disk, a nonvolatile memory, or the like. In this case, the programs and data stored in the external storage device 308 are normally held even in a case where the external storage device 308 is powered off and then powered on. Note that an operating system (OS) may be introduced into the external storage device 308 in advance. This allows designation of programs using file names, and the like. In this regard, the OS is basic software for the computer, and a commonly known OS can be used.

Note that the computer in FIG. 3 may be configured on a cloud.

(Data Structure)

Figure 4:
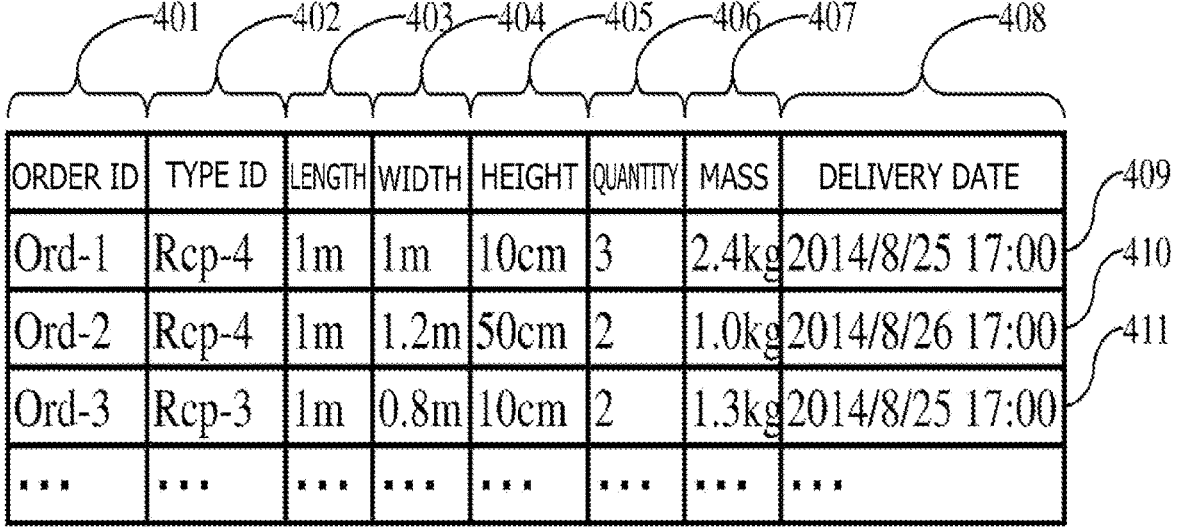
FIG. 4 illustrates an example of an order input to the production schedule change assistance apparatus from an order information management system.

FIG. 4 illustrates an example of an order input to the production schedule change assistance apparatus 102 from the order information management system 101. The order includes, for each order, an order ID 401, a type ID 402 indicating the type of a product, the dimensions of the product including a length (depth) 403, a width 404, and a height 405, the quantity 406 of products, the mass 407 per product, and a delivery date 408. The length 403, width 404, and height 405 of the product and the mass 407 per product are predetermined for a model designation representing the type of the product in a case where the product is standardized. Thus, the model designation may be used as the type ID 402, and the length 403 of the product and the like may be omitted.

The order ID 401 is an identifier uniquely identifying the order. The example illustrated in FIG. 4 represents "Ord-1," "Ord-2," and "Ord-3" as the order ID 401. The type ID 402 is an identifier uniquely identifying the type of the product.

The items from the length 403 of the product to the delivery date 408 have literal meanings. For example, an order with an order ID 401 of "Ord-1" represents an order of a product with a type ID 402 of "Rcp-4," a length 403 of "1 m," a width 404 of "1 m," a height 405 of "10 cm," a quantity 406 of "three," a mass 407 of "2.4 kg," and a delivery date 408 of "2014/8/25 17:00."

FIG. 5 illustrates an example of a production schedule output by the production schedule change assistance apparatus 102. The production schedule includes a production schedule ID 501, an order ID 502, a type ID 503 of the product, a step 1 line A ID 504a, a step 1 line B ID 504b, a step 2 ID 505, a step 3 ID 506, a step 4 ID 507, a length 508, a width 509, a height 510, a quantity 511, a mass 512, and a scheduled completion date and time 513.

The schedule ID 501 is an identifier uniquely identifying a schedule. The example in FIG. 5 represents a production schedule with a schedule ID of "Pln-1," a production schedule with a schedule ID of "Pln-2," and a production schedule with a schedule ID of "Pln-3." The order ID 502 is an identifier uniquely identifying an order of a product, and corresponds to the order ID 401. The type ID 503 is an identifier uniquely identifying the type of the product, and corresponds to the type ID 402.

In the example in FIG. 5, step 1 includes a plurality of lines including line A and line B, and step 1 is allocated to one of the lines. The step 1 line A ID 504*a* is an identifier uniquely identifying a step 1 line A corresponding to a production step for the product. A step 1 line B ID 504*b* is an identifier uniquely identifying a step 1 line B corresponding to a production step for the product. A step 2 ID 505 is an identifier uniquely identifying step 2 corresponding to a production step for the product. A step 3 ID 506 is an identifier uniquely identifying step 3 corresponding to a production step for the product. A step 4 ID 507 is an identifier uniquely identifying step 4 corresponding to a production step for the product.

The items from the length 508 to the mass 512 have literal meanings for the product, and correspond to the items of the length 403 to the mass 407 of the order. The scheduled completion date and time 513 is the scheduled date and time when the product is completed and, for the production schedule, needs to be a date and time before the delivery date 408 of the order.

For example, a production schedule with a schedule ID 501 of "Pln-1" is a production schedule corresponding to an order ID 502 of "Ord-2," the type ID 503 is "Rcp-4," the step 1 line A ID 504*a* is "ChgA5-1," the step 2 ID 505 is "Cst3-1," the step 3 ID 506 is "Slb6-0," the step 4 ID 507 is "Rol-4," the length 508 is "1 m," the width 509 is "1.2 m," the height 510 is "50 cm," the quantity 511 is "2," the mass 512 is "1.0 kg," and the scheduled completion date and time 513 is "2014/8/24 04:24."

Preparation of a production schedule includes allocating the step 1 line A ID 504*a*, the step 1 line B ID 504*b*, the step 2 ID 505, the step 3 ID 506, and the step 4 ID 507 in accordance with the type ID 402, length 403, width 404, height 405, quantity 406, mass 407, and delivery date 408 included in the order.

For each of step 1 line A, step 1 line B, step 2, step 3, and step 4, the order, indicating how many times the step has been executed, is important information, and thus in the present embodiment, the step 1 line A ID 504*a*, the step 1 line B ID 504*b*, the step 2 ID 505, the step 3 ID 506, and the step 4 ID 507 are each associated with an ordinal number.

(Production Management System Processing Flow)

Figure 6:
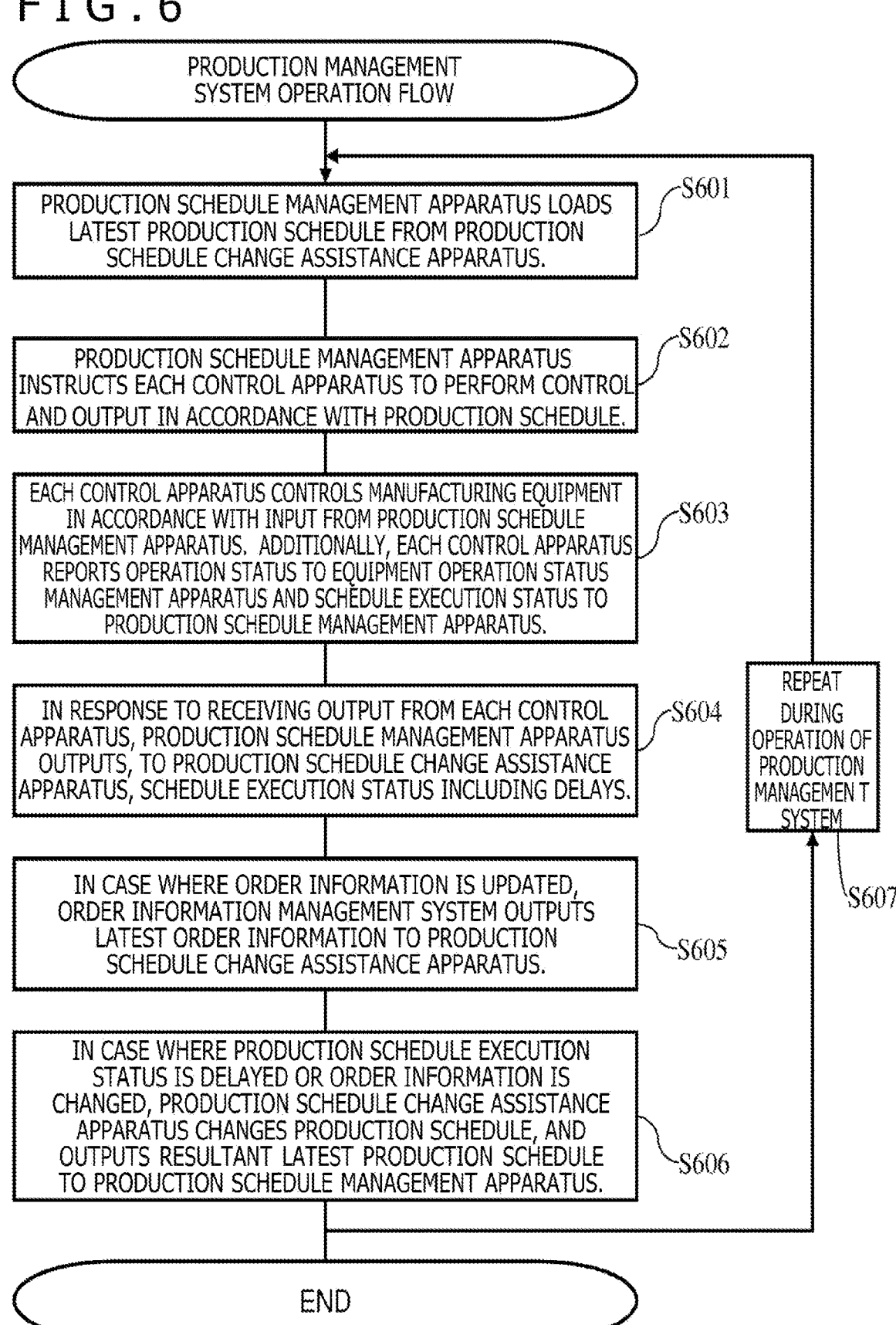
FIG. 6 is an operation flowchart of the production management system.

FIG. 6 is a processing flowchart of the production management system 100 in the embodiment.

The production schedule management apparatus 103 loads the latest production schedule from the production schedule change assistance apparatus 102 (S601).

In accordance with the production schedule, the production schedule management apparatus 103 instructs the control apparatuses, that is, the first step control apparatus 105, the second step control apparatus 107, . . . , and the n-th step control apparatus 111, to perform control and output (S602).

The control apparatuses, that is, the first step control apparatus 105, the second step control apparatus 107, . . . , and the n-th step control apparatus 111 respectively control the manufacturing equipment in the first step 106, the second step 108, . . . , and the n-th step 112. Furthermore, each of the control apparatuses transmits the equipment operation status and schedule execution status of the control apparatus to the equipment operation status management apparatus 113 and the production schedule management apparatus 103 (S603).

The production schedule management apparatus 103 receives outputs from the control apparatuses and transmits the schedule execution statuses including delays to the production schedule change assistance apparatus 102 (S604).

In response to update of the order information such as acceptance of an interrupt order, the order information management system 101 outputs the latest order information to the production schedule change assistance apparatus 102 (S605).

In response to a delay in the production schedule execution status or a change in the order information, the production schedule change assistance apparatus 102 changes the production schedule and outputs the resultant latest production schedule to the production schedule management apparatus 103 (S606).

S601 to S606 are repeated during operation of the production management system 100 (S607).

(Whole Processing Flow)

FIG. 7 is a flowchart of whole processing executed by the production schedule change assistance apparatus in the embodiment. The whole processing executed by the production schedule change assistance apparatus 102 includes a learning phase and an operation phase.

In the learning phase, the schedule change model creation section 202 creates the schedule change model 215 from the past schedule change information 213 (S701).

Then, the schedule change evaluation indicator creation section 203 generates the schedule change evaluation indicator 217 from the past schedule change information 213 and the schedule change model 215 generated in S701 (S702).

In S703, a production schedule change instruction is waited for. With no production schedule change instruction provided, waiting is continued (S704), and provision of a production schedule change instruction causes transitioning to the operation phase.

In the operation phase, the schedule creation section 201 generates the proposed alternative schedule candidate group 216 from the original schedule and the schedule change model (S705).

Then, the schedule creation section 201 selects, from the proposed alternative schedule candidate group 216 generated, a proposed schedule for which the best value is indicated by the schedule change evaluation indicator created in the learning phase, and outputs the selected schedule as an alternative schedule to the production schedule management apparatus 103 (S706).

The learning phase and the operation phase will be described below in detail.

(Learning Phase)

FIG. 8 is a flowchart of learning (advance preparation) performed by the production schedule change assistance apparatus.

The control section 205 receives an input of the sub KPI (evaluation indicator) group 214 from the operator of the production management system 100 via the user interface 204 (S801).

FIG. 9 illustrates an example of an input screen displayed when the control section 205 receives an input of the sub KPI group from the operator in S801. A modification KPI input screen in FIG. 9 displays four sub KPIs, the first sub KPI is a "total delivery delay time," the second sub KPI is a "total production lead time," the third sub KPI is the "number of changes in schedule," and the fourth sub KPI is the "working hours between 18:00 and 24:00." Further sub KPIs can be added to the modification KPI input screen.

The schedule change model creation section 202 creates the schedule change model 215 from the past schedule change information 213 (S802). In this regard, the past schedule change information 213 is information including records of past steps before each of which, in response to a change in order information such as acceptance of an interrupt order, a step for the interrupt order was inserted, and records of steps corresponding to the resultant change in the order of steps. By using a mathematical technique such as machine learning on the basis of the past schedule change information, a probability model for a given production schedule and a given interrupt order can be calculated which model is related to the steps before each of which a step for the interrupt order is inserted and the steps corresponding to the resultant change in the order of steps. By using the existing mathematical technique as described above, the schedule change model 215 is created.

The schedule creation section 201 uses the past schedule change information 213 and the schedule change model 215 to create a "group of unselected proposed alternative schedule candidates" (S803). In this regard, the "group of unselected proposed alternative schedule candidates" is generated by using the schedule change model 215 for the original schedule 212 unchanged and included in the past schedule change information 213. The proposed alternative schedule candidate group generated in this case is a group of proposed candidates unselected during past changes in schedules.

The production simulator 200 calculates values for the sub KPI (evaluation indicator) group 214, for proposed schedule changes included in the past schedule change information 213 and implemented in the past and for the "group of unselected proposed alternative schedule candidates" (S804).

The schedule change evaluation indicator creation section 203 creates the schedule change evaluation indicator 217 as a weighted sum for the sub KPI group (S805). At this time, the weight for each sub KPI is determined using an existing technique such as curve fitting such that proposed schedule changes implemented in the past have the best evaluation indicator compared to the "group of unselected proposed alternative schedule candidates."

For a sub KPI input on the modification KPI input screen in FIG. 9, for example, the schedule change evaluation indicator is as indicated by (Equation 1).

$$f(x)=a^*(\text{total delivery delay time})+b^*(\text{total production lead time})+c^*(\text{number of changes in schedule})+d^*(\text{working hours between 18:00 and 24:00}) \quad \text{(Equation1)}$$

Here, a, b, c, and d are weights for the respective sub KPIs. (Operation Phase)

FIG. 10 is a flowchart of a production schedule change (operation phase) effected by the production schedule change assistance apparatus in the embodiment.

The communication section 206 receives the schedule execution status information and the equipment operation status information from the production schedule management apparatus 103 and the equipment operation status management apparatus 113. Additionally, the communication section 206 receives the order information from the order information management system 101 (S1001).

The control section 205 rewrites the simulation condition 211 on the basis of the schedule execution status information and the equipment operation status information (S1002).

The schedule creation section 201 cerates the proposed alternative schedule candidate group 216 from the schedule for the day (original schedule) 212 and the schedule change model 215 (S1003). In this regard, the schedule change model 215 in the present embodiment is a model representing the probability that, in response to a change in the order information such as acceptance of an interrupt order, a step for the interrupt order is inserted before a certain step in the original schedule and the probability that the insertion of the step for the interrupt order before the certain step in the original schedule leads to a change in the order of the steps of the original schedule. On the basis of this probability model, for the proposed alternative schedule candidate group, a plurality of different proposed alternative schedules are created by, for example, inserting the step for the interrupt order at a point with the highest probability that the corresponding step is inserted and changing the order of the steps only in a portion of the schedule having the highest probability that the order is changed; inserting the step for the interrupt order at a point with the highest probability that the corresponding step is inserted, and selecting a set number of portions for a change in step order, in order of decreasing probability that the order of steps is changed and changing the order of the steps in the selected portions; inserting the step for the interrupt order at a point with the second highest probability that the corresponding step is inserted and changing the order of the steps in all portions having a probability equal to or greater than a set threshold; or randomly selecting some steps from the above-described proposed schedule and changing the order of these steps. A method for creating the schedule change model 215 is as described for the flow of learning (advance preparation) performed by the production schedule change assistance apparatus.

The production simulator 200 implements simulation for the proposed alternative schedule candidate group 216 created in S1003 and calculates the value of the schedule change evaluation indicator 217 (S1004). A method for creating the schedule change evaluation indicator 217 is as described for the flow of learning (advance preparation) performed by the production schedule change assistance apparatus.

The control section 205 selects, from the proposed alternative schedule candidate group 216, the alternative schedule candidate for which the schedule change evaluation indicator 217 indicates the best value, and transmits the selected alternative schedule candidate as the latest production schedule to the user interface 204 and the communication section 206 (S1005).

The user interface 204 displays the latest production schedule and the value of the schedule change evaluation indicator 217 to the operator (S1006).

The communication section 206 transmits the latest production schedule to the production schedule management apparatus 103 (S1007). Then, the production management system 100 executes the latest production schedule.

FIG. 11 illustrates an example of schedule change effected in a case where the need arises to add a rush order to the production schedule (original schedule) illustrated in FIG. 5. "Pln-17" indicating a rush order is interposed into step 1 line A or the like to move "Pln-1" to "Pln-3" in the original schedule to after "Pln-17," and the production for "Pln-17" is performed promptly as indicated in the "scheduled completion date and time."

A program according to the present invention is integrated into a computer to cause the computer to execute a production schedule change assistance method. By integrating the program of the present invention into the computer, the production schedule change assistance method illustrated in the flowcharts in FIGS. 7, 8, and 10 and the like is executed.

The program according to the present invention will be described below.

(1) A program causing a computer to execute a production schedule change assistance method for changing a production schedule in response to a change in order information, the program causing the computer to execute:

a step of rewriting a simulation condition on a basis of schedule execution status information and equipment operation status information;

a step of creating a proposed alternative schedule candidate group from an original production schedule and a schedule change model already learned;

a step of implementing simulation for the proposed alternative schedule candidate group and outputting, on a basis of a schedule change evaluation indicator already learned, values of the schedule change evaluation indicator for respective alternative schedule candidates of the proposed alternative schedule candidate group; and a step of selecting an alternative schedule candidate for which the schedule change evaluation indicator indicates a best value, from the proposed alternative schedule candidate group, as a latest production schedule.

(2) Additionally, the program described above, further causing the computer to execute, as a learning phase:

a step of receiving an input of an evaluation indicator group from an operator;

a step of creating a schedule change model from past schedule change information; and a step of generating a schedule change evaluation indicator from the past schedule change information and the schedule change model.

(3) Additionally, the program described above, further causing the computer to execute:

a step of creating a group of unselected proposed alternative schedule candidates by using the past schedule change information and the schedule change model; and a step of calculating values of the evaluation indicator group for a proposed schedule change implemented in past and the group of unselected proposed alternative schedule candidates, in which the schedule change evaluation indicator is a weighted sum of evaluation indicators of the evaluation indicator group.

According to the present embodiment, a schedule change model that is not affected by an environmental variation is learned from past schedule change information, and then a solution of the schedule change model is determined to be an initial proposed schedule, and the initial proposed schedule is modified according to conditions after an environmental variation. Even in a case where, for constraint conditions used as requirements for scheduling, there is a difference between constraint conditions used at the time of creation of a determination model related to a change in a production schedule and constraint conditions at the time of creation of an alternative schedule, due to a change in environmental conditions for the day such as the availability of extra human resources and facilities for the day, a maintenance status, a production progress status, and the like, a proposed alternative schedule that allows the variation to be dealt with can be quickly created.

What is claimed is:

1. A production schedule change assistance apparatus for changing a production schedule in response to a change in order information, the production schedule change assistance apparatus comprising:

a processor, a memory, and a storage;

a schedule change model creation device configured to create, in a learning phase, from past schedule change information, a schedule change model estimating a portion of the schedule to be changed in response to an order change and a content of the change;

a schedule creation device in communication with the processor and configured to:

use, in the learning phase, the schedule change model to generate a group of proposed schedule changes unselected at a time of past implementation of schedule changes, and use, in an operation phase, the schedule change model already learned, to generate a proposed alternative schedule candidate group for the order change;

a schedule change evaluation indicator creation device in communication with the processor and configured to generate, in the learning phase, a schedule change evaluation indicator indicating a best value for a proposed schedule change implemented at a time of past schedule change compared to proposed schedule changes unselected at the time of past schedule change, wherein the schedule change evaluation indicator is a weighted sum of evaluation indicators of an evaluation indicator group, the weighted sum determined by comparing the group of proposed schedule changes unselected at the time of past implementation of schedule changes with a group of proposed schedule changes implemented at the time of past implementation;

a production simulator device in communication with the processor and configured to implement, in the operation phase, simulation with a simulation condition changed on a basis of schedule execution status information and equipment operation status information for a predetermined day and calculate values of the schedule change evaluation indicator for the proposed alternative schedule candidate group on a basis of the schedule change evaluation indicator already learned;

a control device in communication with the processor and configured to output, as a latest production schedule, a proposed schedule change included in the proposed alternative schedule candidate group and for which the schedule change evaluation indicator indicates the best value; and a display configured to display the latest production schedule selected and the value of the schedule change evaluation indicator for the latest production schedule, wherein based upon the displayed proposed schedule change the production schedule change assistance apparatus creates an advance scheduling proposal on the predetermined day.

2. The production schedule change assistance apparatus according to claim 1, further comprising:

a communication device configured to receive the schedule execution status information and the equipment operation status information.

3. The production schedule change assistance apparatus according to claim 1, further comprising:

a user interface configured to display on the display the latest production schedule selected and the schedule change evaluation indicator for the latest production schedule.

4. The production schedule change assistance apparatus according to claim 3, wherein the user interface receives an input of the evaluation indicator group.

5. A production schedule change assistance method for changing a production schedule in response to a change in order information, the production schedule change assistance method comprising:

rewriting by a control device a simulation condition on a basis of schedule execution status information and equipment operation status information;

creating by a schedule creation device a proposed alternative schedule candidate group from an original production schedule and a schedule change model already learned;

simulator implementing by a production simulator device simulation for the proposed alternative schedule candidate group and outputting, on a basis of a schedule change evaluation indicator already learned, values of the schedule change evaluation indicator for respective alternative schedule candidates of the proposed alternative schedule candidate group;

section selecting by the control device an alternative schedule candidate for which the schedule change evaluation indicator indicates a best value, from the proposed alternative schedule candidate group, as a latest production schedule;

creating by a schedule change model creation device a schedule change model from past schedule change information; and generating by a schedule change evaluation indicator creation device a schedule change evaluation indicator from the past schedule change information and the schedule change model, wherein the schedule change evaluation indicator is a weighted sum of evaluation indicators of an evaluation indicator group, the weighted sum determined by comparing a group of proposed schedule changes unselected at the time of past implementation of schedule changes with a group of proposed schedule changes implemented at the time of past implementation.

6. The production schedule change assistance method according to claim 5, further comprising:

a step of a user interface displaying the latest production schedule selected and the schedule change evaluation indicator for the latest production schedule.

7. The production schedule change assistance method according to claim 5, further comprising, as a learning phase:

receiving by the control device an input of the evaluation indicator group from an operator.

8. The production schedule change assistance method according to claim 7, further comprising:

creating by the schedule creation device a group of unselected proposed alternative schedule candidates by using the past schedule change information and the schedule change model; and a step of the production simulator calculating values of the evaluation indicator group for a proposed schedule change implemented in past and the group of unselected proposed alternative schedule candidates, wherein the schedule change evaluation indicator is a weighted sum of evaluation indicators of the evaluation indicator group.

9. The production schedule change assistance method according to claim 7, wherein machine learning is used in the step of creating the schedule change model from the past schedule change information.

10. A non-transitory computer-readable medium having stored therein a program causing a computer to execute a production schedule change assistance method for changing a production schedule in response to a change in order information, the program causing the computer to execute:

rewriting a simulation condition on a basis of schedule execution status information and equipment operation status information;

creating a proposed alternative schedule candidate group from an original production schedule and a schedule change model already learned;

implementing simulation for the proposed alternative schedule candidate group and outputting, on a basis of a schedule change evaluation indicator already learned, values of the schedule change evaluation indicator for respective alternative schedule candidates of the proposed alternative schedule candidate group;

selecting an alternative schedule candidate for which the schedule change evaluation indicator indicates a best value, from the proposed alternative schedule candidate group, as a latest production schedule;

creating a schedule change model from past schedule change information; and generating a schedule change evaluation indicator from the past schedule change information and the schedule change model wherein the schedule change evaluation indicator is a weighted sum of evaluation indicators of an evaluation indicator group, the weighted sum determined by comparing a group of proposed schedule changes unselected at the time of past implementation of schedule changes with a group of proposed schedule changes implemented at the time of past implementation.

11. The non-transitory computer-readable medium according to claim 10, further causing the computer to execute, as a learning phase:

receiving an input of the evaluation indicator group from an operator.

12. The non-transitory computer-readable medium according to claim 11, further causing the computer to execute:

creating a group of unselected proposed alternative schedule candidates by using the past schedule change information and the schedule change model; and calculating values of the evaluation indicator group for a proposed schedule change implemented in past and the group of unselected proposed alternative schedule candidates, wherein the schedule change evaluation indicator is a weighted sum of evaluation indicators of the evaluation indicator group.

* * * * *